July 16, 1963     H. E. TOWZEY, JR     3,097,817
AIRFOIL DESIGN FOR JET ENGINED AIRCRAFT
Filed April 5, 1962     5 Sheets-Sheet 1
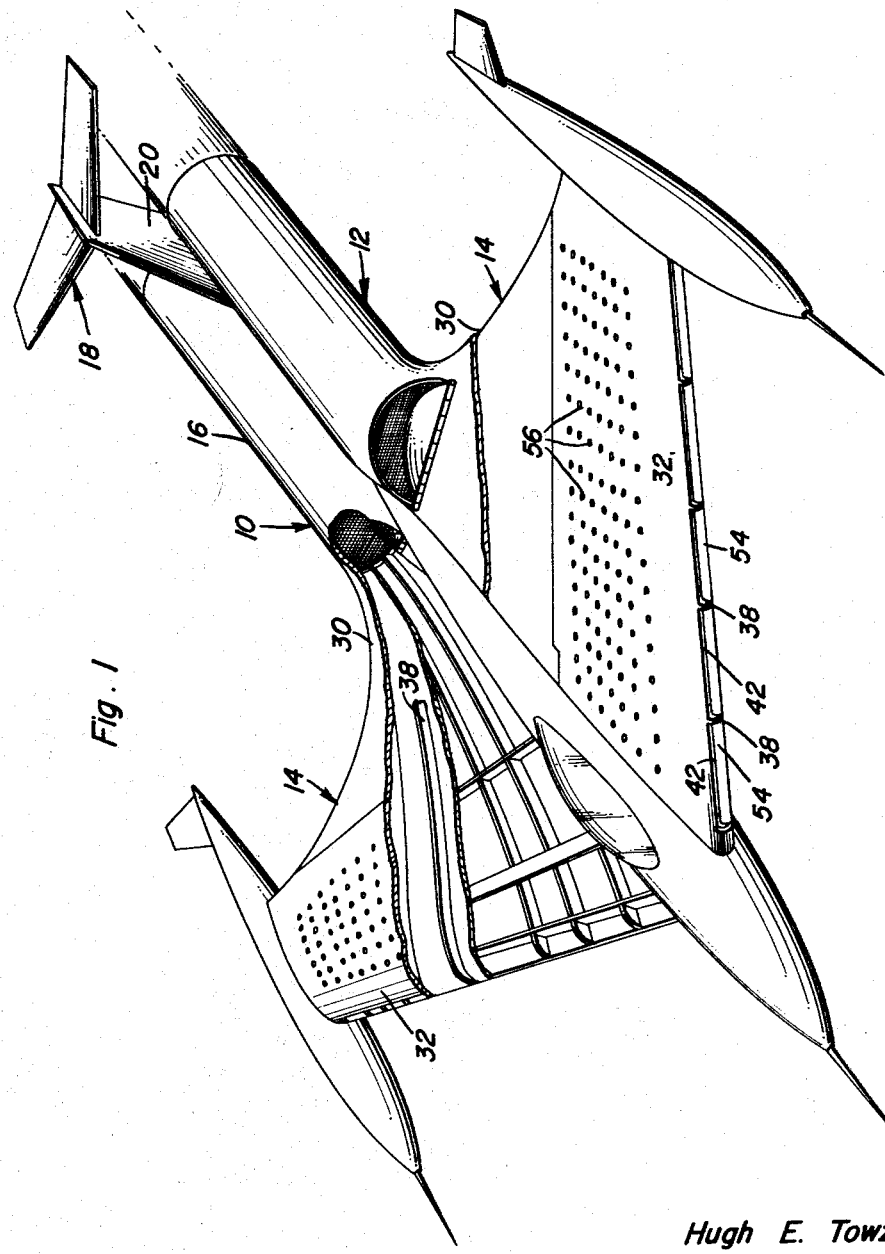
Fig. I
Hugh E. Towzey, Jr.
INVENTOR.
BY

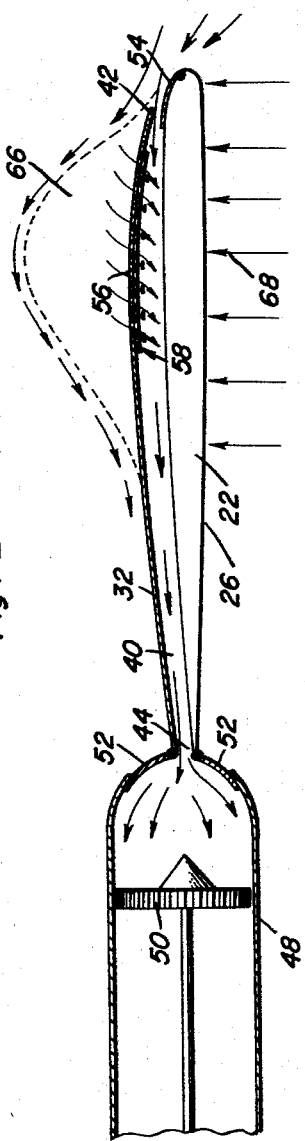
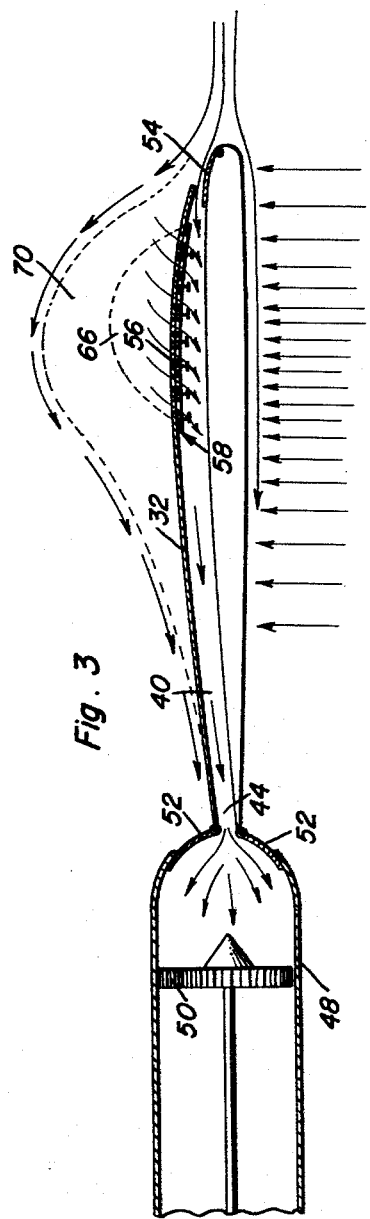
Hugh E. Towzey, Jr.
INVENTOR.

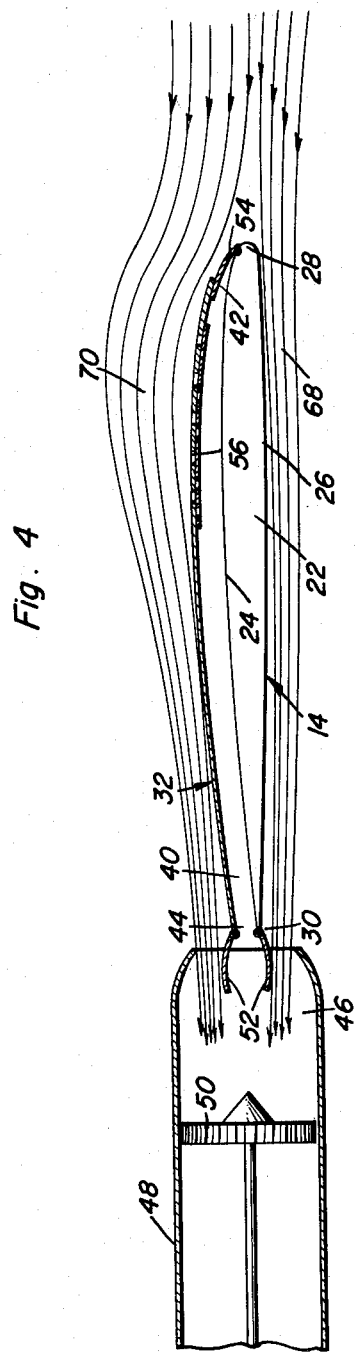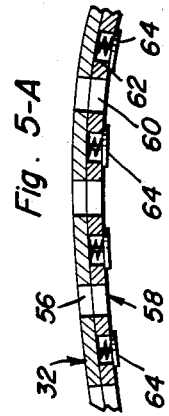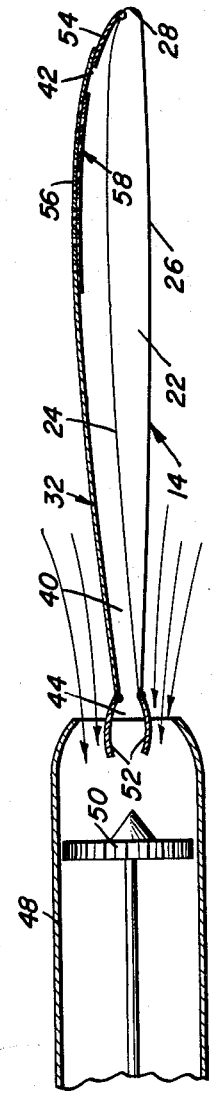

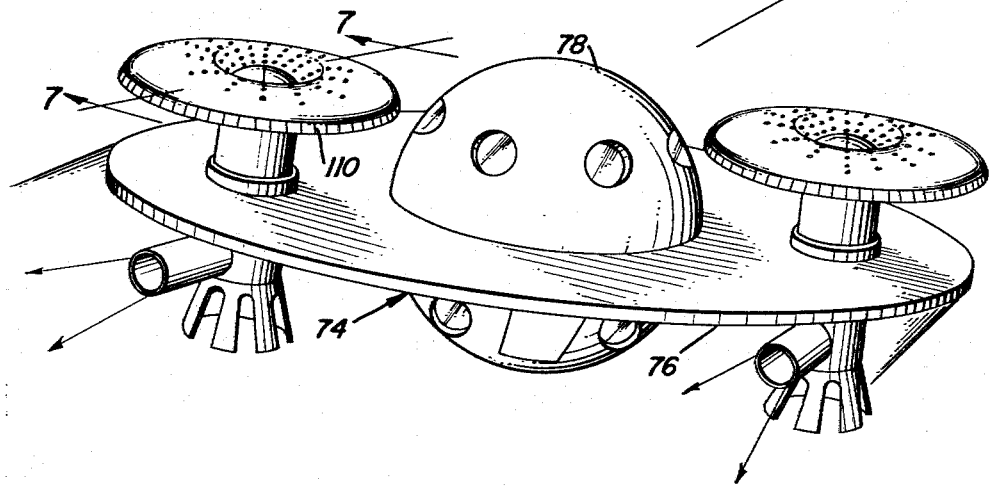
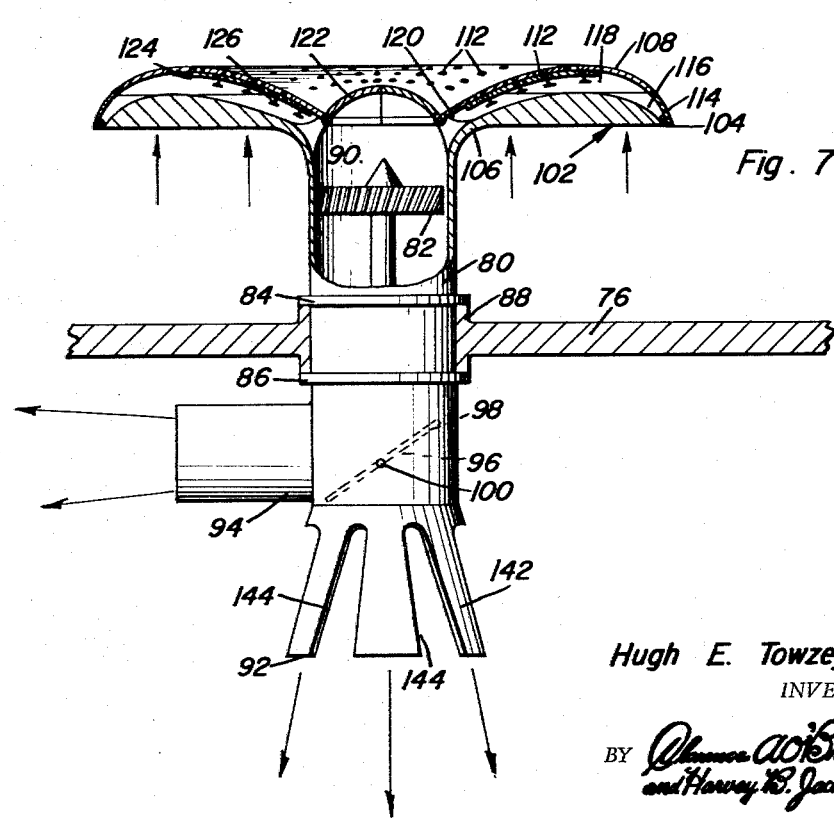

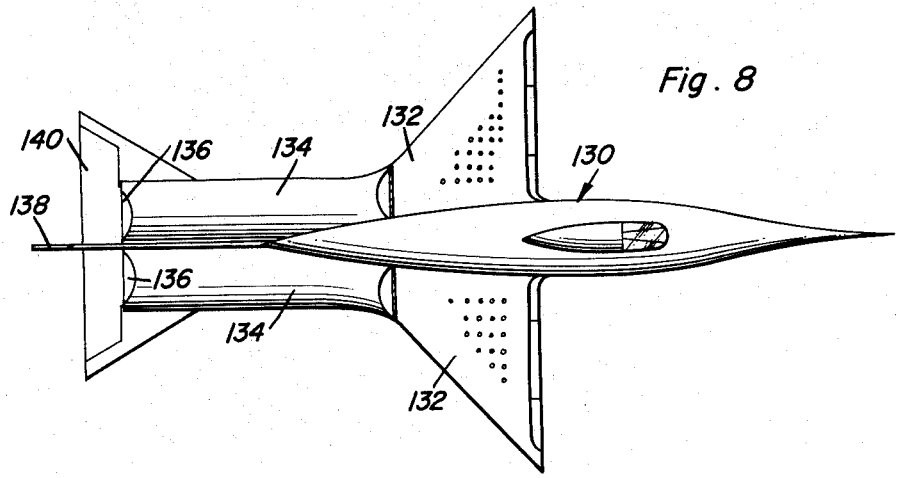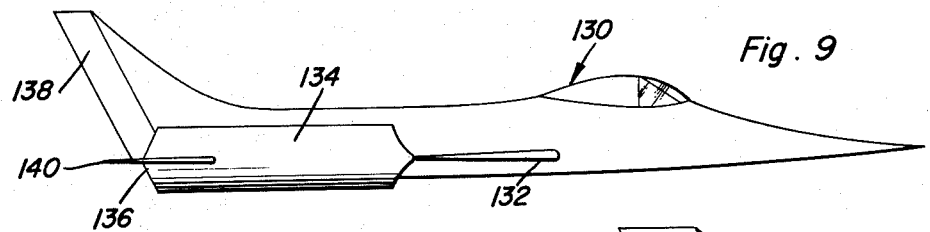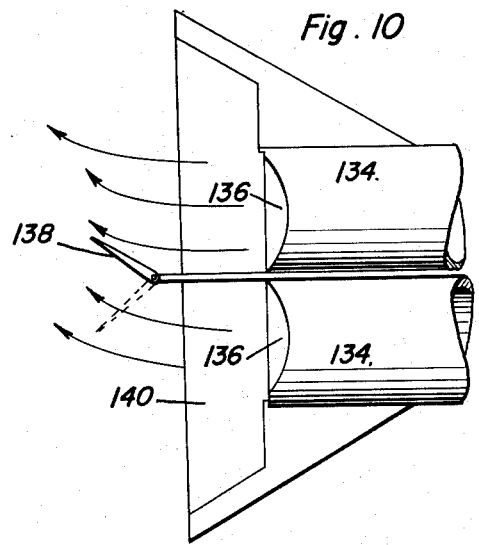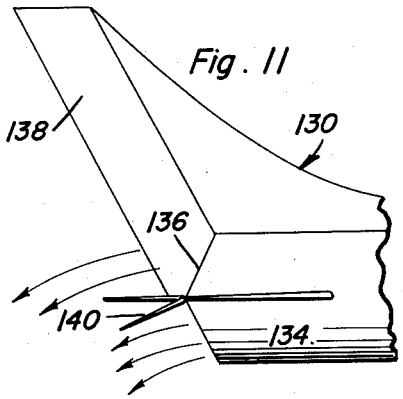
Hugh E. Towzey, Jr.
INVENTOR.

United States Patent Office 3,097,817
Patented July 16, 1963

3,097,817
AIRFOIL DESIGN FOR JET ENGINED AIRCRAFT
Hugh E. Towzey, Jr., Goleta, Calif.
(1837 Clark Ave., Apt. 10, Palo Alto, Calif.)
Filed Apr. 5, 1962, Ser. No. 185,317
19 Claims. (Cl. 244—15)

This invention relates to a novel and useful airfoil design and more specifically to an airfoil design primarily adapted to be used in conjunction with aircraft having jet engines as a propelling means. The airfoil design of the instant invention is provided with an upper outer camber member which is supported from the airfoil and extends over the upper surface of the airfoil member in spaced relation thereto from a point adjacent the leading edge of the airfoil to a point adjacent the trailing edge thereof whereby an air passage is formed between the airfoil member and the camber member having its inlet and outlet adjacent the leading and trailing edges of the airfoil respectively. Suitable control flap valve means are movably mounted on the airfoil and may be utilized to vary the effective opening of the inlet of the passage and the camber member is provided with air inlet openings between its leading and trailing edges having closure valve means operatively associated therewith to selectively open and close the air inlet openings. The outlet of the air passage formed between the airfoil and the camber member is registered with the inlet or air intake of a jet engine used to propel the aircraft of which the airfoil comprises a part and the jet engine also includes further air intake means opening outwardly of the outer surface of the camber and is provided with control valve flap means to vary the effective opening of the air intake for the jet engine which opens outwardly of the camber member. In this manner, if it is desired, all or a portion of the air entering the air intake of the jet engine may be forced to pass through the air passage defined between the airfoil and the camber member. The air passing through the air passage may either enter through the inlet defined between the leading edges of the airfoil and the camber member or it may be drawn inwardly through the air inlet openings formed in the camber member rearwardly of the leading edge thereof.

By means of the aforementioned construction, an aircraft having the airfoil design of the instant invention may supplement the lift normally afforded by the air foil by passing a portion of the intake of air into the jet engine of the aircraft through the air passage from the inlet opening thereof along the leading edge of the airfoil and the inlet openings formed in the camber member. The flow of air about the airfoil member and the camber member will afford the normal amount of lift due to forward progress of the airfoil and camber member through the air and the intake of air through the leading edge of the airfoil member and the inlet openings formed in the camber member will supplement the lift normally afforded by the airfoil member alone.

The main object of this invention is to provide a novel airfoil design including an upper outer camber member extending over the upper surface of the airfoil defining an air passage which, when the outlet end of the air passage at the trailing edge of the airfoil is communicated with the intake of a jet engine, will enable the inrush of air into the jet engine to augment the normal lift afforded by the airfoil member. moving forwardly through the air.

A further object of this invention, in accordance with the preceding object, is to provide a novel airfoil design from which a greater coefficient of lift may be obtained without increasing the area of the airfoil.

A still further object of this invention is to provide an airfoil design including means for communicating the air intake of jet engines utilized in propelling the aircraft and which the airfoil comprises a part with the leading edge portion of the airfoil whereby air immediately ahead of the leading edge of the airfoil may be drawn into the air intake of the jet engine in order to reduce the magnitude of shock waves formed immediately forwardly of the leading edge of the airfoil when moving at high speed.

A still further object of this invention is to provide a novel means for assisting the maneuvering of a jet aircraft by positioning movable control surfaces in direct alignment with the discharge of a jet engine of the aircraft whereby the jet discharge effected by the jet engine may be laterally deflected and utilized in assisting the maneuvering of the aircraft.

A final object to be specifically enumerated herein is to provide a novel airfoil design in accordance with the preceding objects which will be readily adaptable to substantially all types of conventional aircraft using airfoils for obtaining a lifting force as well as to other types of jet aircraft normally utilizing the thrust of jet engines alone for effecting substantially all of the lifting force.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an aircraft having a generally conventional configuration and with the airfoil design of the instant invention incorporated therein, parts of the jet aircraft being broken away and shown in section;

FIGURES 2 through 5 are schematic views in section illustrating the component parts of the airfoil design of the instant invention in different phases of operation;

FIGURE 5a is an enlarged schematic view in section of the camber member of the airfoil showing the inlet openings formed therein with the movable closure valve means operably associated therewith and showing the safety pressure differential valve means of the closure valve means in closed position;

FIGURE 6 is a perspective view of a modified form of aircraft utilizing the modified form of airfoil design of the instant invention;

FIGURE 7 is an enlarged fragmentary vertical sectional view taken substantially upon a plane indicated by section line 7—7 of FIGURE 6;

FIGURE 8 is a top plan view of a modified form of aircraft similar to that shown in FIGURE 1 and including movable tail control surfaces disposed in alignment with the discharge of the jet engines of the modified form of aircraft;

FIGURE 9 is a side elevational view of the embodiment illustrated in FIGURE 8;

FIGURE 10 is a fragmentary enlarged top plan view of the rear portion of the aircraft illustrated in FIGURE 8; and FIGURE 11 is an enlarged fragmentary side elevational view of the rear portion of the aircraft illustrated in FIGURE 9.

Referring now more specifically to the drawings the numeral 10 generally designates an aircraft including an elongated fuselage generally referred to by the reference numeral 12 having a pair of laterally directed wings 14 and aft portion 16 in which there are disposed conventional jet engines.

The tail of the aircraft 10 includes a stabilizer structure generally referred to by the reference numeral 18 which is supported from a rudder structure 20.

With attention now directed to FIGURES 2 through 5a of the drawings, it will be seen that each wing 14 includes an airfoil 22 having upper and lower surfaces 24 and 26 respectively. The leading edge portion of the wing 14 is designated by the reference numeral 28 and the trailing edge portion thereof is designated by the reference numeral 30.

Supported from the airfoil 22 is a camber member generally referred to by the reference numeral 32 which extends from the leading edge portion of the airfoil 22 to the trailing edge portion 30 thereof. The camber member 32 is supported in spaced relation above the upper surface of the airfoil 22 by means of upstanding ribs or baffles 38 and it will be noted that the ribs or baffles 38 curve smoothly toward the rearmost of the trailing edge portion 30 of each wing 14, see FIGURE 1. A channel or passage 40 is defined between the confronting surfaces of the airfoil 22 and the camber member 32 and the inlet of the passage 40 is designated by the reference numeral 42 and extends along the leading edge portion 28 of the wing 14 while the outlet of the passage 40 is designated by the reference numeral 44 and is in communication with the air intake 46 of the corresponding jet motor. Each of the jet motors is provided with a housing 48 which is generally cylindrical and a turbine wheel 50 is rotatably journaled in each corresponding housing 48 for rotation about its longitudinal axis and comprises a part of the corresponding jet motor.

A plurality of control valve flaps 52 are pivotally mounted from the airfoil 22 and camber member 32 of each wing 14 and are movable toward and away from closed positions terminating communication of the air intake 46 with the ambient atmosphere while communication between the outlet of the passages 40 is maintained with the corresponding air inlet 46.

A plurality of closure valve flaps 54 are pivotally supported from the leading edge portion 38 of each airfoil 22 between adjacent ones of the ribs 38 and are movable between open and closed positions opening and closing the inlet 42 of the corresponding wing 14. In addition, each of the camber members 32 is provided with a plurality of inlet openings 56 and movable intake valve means generally referred to by the reference numeral 58 for selectively opening and closing the inlet openings 56 which are formed in the corresponding camber member 32 adjacent the leading edge thereof. Each of the intake valve means 58 comprises a plate like member conforming to the undersurface of the corresponding camber member 32 and mounted therefrom in any convenient manner for sliding movement relative to the camber member. Each of the plate-like members 58 is provided with a plurality of first openings 60 which are simultaneously registerable with the openings 56 and a plurality of secondary openings 62 which are also simultaneously registerable with the openings 56 but which are normally closed by means of safety pressure differential valve means 64.

With attention now directed more specifically to FIGURE 2 of the drawings it will be seen that the closure valve flaps 52 are disposed in the closed position whereby all of the air admitted into the jet engine housing 48 must pass through the corresponding passage 40. As both the control valve flaps 54 and the intake valve means 58 are disposed in the open position, air is admitted into the passage 40 by means of the inlet openings 56 and the inlet 42. If the airfoil 22 is stationary as illustrated in FIGURE 2, the inrush of air through the inlet openings 56 will create a low pressure area 66 above the camber member 32 and thus an area of higher pressure 68 beneath the lower surface 26 of the airfoil 22.

With attention now directed to FIGURE 3 of the drawings it will be seen that the components parts of the airfoil design are in the same relative positions as they appear in FIGURE 2 of the drawings. However, in FIGURE 3 the airfoil 22 is in forward motion and the low pressure area 66 is supplemented by the normal low pressure area 70 formed by forward progress of the airfoil 22 and the resultant movement of air over both the upper surface of the camber member 32 and under the lower surface of the airfoil 22.

With attention now directed to FIGURE 4 of the drawings it may be seen that the control valve flaps 52 are disposed in the open position communicating the intake 46 with the ambient atmosphere and that the control valve flaps 54 and intake valve means 58 are also closed. Accordingly, it may be seen that forward progress of the airfoil 22 through the air creates the normal low pressure area 70 above the camber member 32 and the resultant relatively high pressure area 68 below the air foil 22. In addition, the inrush of air into the intake 46 will further accelerate the movement of air over the camber member 32 and under the airfoil 22 whereby the differential in the speed of air passing over and under the airfoil will be increased beyond that normally effected by the forward movement of the airfoil through the air.

In FIGURE 5 of the drawings it may be seen that the component parts of the airfoil design are disposed relative to each other as they are in FIGURE 4 and that normal operation of the jet engine is not affected by the airfoil design when the airfoil is substantially stationary. Accordingly, the airfoil design including the airfoil 22 and the camber member 32 operates in the conventional manner when the control valve flaps 54 and intake valve means 58 are in the closed positions and the control valve flaps 52 are open.

Should either of the control valve flaps 54 or the intake valve means 58 malfunction when in the closed position during the period the control valve flaps 52 are closed, the safety pressure differential valve means 64 and/or 52 will open due to the increased reduction in pressure within the passage 40 relative to the ambient atmosphere and thus admit air into the air intake 46 of the jet engine via the passage 40.

With attention now directed to FIGURES 6 and 7 of the drawings, there will be seen a modified form of aircraft generally designated by the reference numeral 74. The aircraft 74 includes a platform 76 and a centrally disposed cabin 78. A pair of jet engine cylindrical housings 80 are rotatably journaled for rotation about axes extending at right angles to the medial plane of the platform 76 and generally paralleling the longitudinal axes of the housings 80. Each of the housings 80 has a jet engine (not shown) disposed therein, for which the platform 76 may house fuel tanks (not shown), and which provide stability by means of their inherent gyroscopic action. Each of the jet engines includes a turbine wheel 82 comprising air pump means that is journaled for rotation about an axis generally paralleling the longitudinal axis of the corresponding housing 80. The housing 80 is rotatably journalled, between the annular rings 84 and 86 which are spaced longitudinally thereof by means of a journal portion 88 formed in the corresponding portion of the platform 76. The housings 80 each include an air intake 90 corresponding to air intake 46 and an air outlet 92. Additionally, each of the housings 80 includes a supplemental air outlet 94 which opens at substantially right angles to the longitudinal axis of the housing 80.

Each of the housings 80 includes movable discharge deflecting means 96 in the form of a damper plate 98 which is rotatably supported by means of a pivot pin 100 and it will be noted that the damper plate 98 of each housing 80 may be rotated to adjust the amount of discharge through the air outlets 92 and 94.

The upper end of each housing 80 has an annular airfoil generally referred to by the reference numeral 102 supported therefrom which has its medial plane disposed at substantially right angles to the longitudinal axis of the corresponding housing. The leading edge portions 104 of the airfoil 102 are disposed outermost and the trailing edge portions 106 are disposed innermost and about the inlet 90 of the corresponding housing 80. In addition, an annular camber member 108 is secured in overlying relation to the airfoil 102 by means of ribs 110 which are disposed substantially on radii of the housing 80 and it may be seen that the camber member 108 is also provided with a plurality of air inlet openings that are designated by the reference numeral 112. In addition, control valve flaps 114 are disposed between adjacent ones of the ribs 110 and control the inlet 116 of the passage 118 formed between the confronting surfaces of the airfoil 102 and the camber member 108. The outlet of the passage 118 is designated by the reference numeral 120 and is disposed about the inlet 90. Finally, control valve flaps 122 similar to control valve flaps are pivotally supported from the airfoil 102 as are control flaps 114.

The air inlet openings 112 have intake valve means 124 operatively associated therewith similar to inlet valve means 58 and the intake valve means 124 operates in a similar manner to intake means 58 and is provided with a safety pressure differential safety valve means 126. The operation of the aircraft 74 is very similar to the operation of the aircraft 10 in that a reduced pressure zone may be effected above the camber member 108 by opening the control flaps 114 and intake valve means 124. Further, the closure valve flaps 122 may be opened so as to effect a straight through movement of air toward the turbine wheel 82 if desired.

The damper plates 98 may be utilized as shown in FIGURE 7 of the drawings to deflect a portion of the discharge from the turbine wheel 82 laterally of the corresponding housing 80 and each housing 80 may be rotated about its longitudinal axis relative to the platform 76 in order to obtain the desired direction of thrust.

With attention now directed to FIGURES 8 through 10 of the drawings there will be seen a modified form of aircraft generally designated by the reference numeral 130. The aircraft 130 includes wings 132 similar to wings 14 and jet engine housings whose outlet ends 136 open rearwardly of the aircraft 130. The aircraft 130 includes movable rudder and stabilizer surfaces 138 and 140 which are disposed in direct alignment with the housing outlets 136 and as can be seen from FIGURES 10 and 11 of the drawings, the control surfaces 138 and 140 may be utilized to not only deflect the stream of air flowing over the outer surfaces of the aircraft 130 but also the discharge from the outlets 136. Therefore, it may be seen that the jet discharge from the outlets 136 may be laterally deflected in order to augment the steering of the aircraft 130 in order to improve upon its maneuverability.

With reference again to FGURES 6 and 7 of the drawings, it will be noted that the lower ends of the housings 80 each define foot portions 142 for the support of the aircraft 74. When the lower ends of the foot portions 142 are disposed on a supporting surface, the discharge from the turbine wheel 82 passes through the transverse openings 144 formed in the foot portions 142 and spaced circumferentially thereabout.

If it is desired, any suitable means may be provided for rotating the housings 80 relative to the platform 76 and for properly operating the intake valve means 58 and 124, the control valve flaps 52 and 122, and the control valve flaps 54 and 114.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an aircraft having an airfoil member including an upper outer camber member supported therefrom and extending over the upper surface of said airfoil member in spaced relation thereto and from a point adjacent the leading edge of said airfoil member to a point adjacent the trailing edge of said airfoil member defining an air passage between said airfoil member and said camber member, said air passage having an inlet and an outlet adjacent the leading and trailing edges of said airfoil member respectively, air pump means having an air intake, said air intake being disposed adjacent the trailing edge of said airfoil member and communicated with said air passage outlet, control valve means movably supported from said aircraft and operable to vary the effective opening of said air intake, said camber member having a plurality of air inlet openings formed therein adjacent its leading edge, movable closure intake valve means operable to selectively open and close said camber member air inlet openings, and movable closure valve means supported from said aircraft for selectively varying the effective opening of said air passage inlet.

2. The combination of claim 1 wherein said control valve means includes means for substantially completely closing said air pump means air intake to the ambient atmosphere while maintaining communication of said air pump means air intake with said air passage outlet.

3. The combination of claim 1 wherein said inlet opening movable intake valve means includes safety pressure differential valve means for at least partially opening said inlet openings in response to pressure reduction in said air passage beyond a given point relative to the air pressure disposed above the outer surface of said camber member.

4. The combination of claim 1 wherein said air pump means is of the axial flow type including a turbine member mounted for rotation about an axis generally paralleling the flow of air into said air pump means air intake and the flow of air out of said air passage outlet.

5. The combination of claim 1 wherein said air pump means includes an outlet, said aircraft including movable tail control surfaces, said tail control surfaces having at least portions thereof disposed in alignment with said air pump means outlet adapted to laterally deflect portions of the discharge therefrom.

6. The combination of claim 1 wherein said air pump means includes an outlet having a longitudinal axis, said aircraft having means including movable control surfaces with portions thereof disposed in alignment with said air pump means outlet for laterally deflecting the discharge from said air pump means outlet.

7. The combination of claim 6 wherein said discharge deflecting means includes means adapted to deflect portions of said discharge at substantially right angles to the longitudinal axis of said air pump means outlet.

8. The combination of claim 1 wherein said air pump means includes an outlet having a longitudinal axis, said aircraft having means including movable control surfaces with portions thereof disposed in alignment with said air pump means outlet for laterally deflecting the discharge from said air pump means outlet, said discharge deflecting means including means adapted to deflect portions of said discharge at substantially right angles to the longitudinal axis of said air pump means outlet, and selectively substantially along a selected one of the radii of the longitudinal axis of said air pump means outlet.

9. The combination of claim 1 wherein said aircraft includes a longitudinal axis along which said aircraft is adapted to move, at least one wing extending generally transversely of the longitudinal axis of said aircraft, said one wing comprising said airfoil member and said air passage inlet extending along the leading edge of said wing, said air pump means being of the axial flow type including a turbine member mounted for rotation about an axis generally paralleling the longitudinal axis of said aircraft, said wing including a trailing edge inclined rearwardly at one end relative to a transverse plane at right angles to the longitudinal axis of said aircraft, the air intake of said air pump means being disposed adjacent the rearmost portion of said trailing edge, said wing including smoothly curved upstanding baffles disposed between said airfoil member and said camber member for routing the air entering said passage via said air passage inlet and said air inlet openings to said air pump means air intake.

10. The combination of claim 1 wherein said airfoil and camber members are generally annular in plan and have their leading edge portions disposed outermost and their trailing edge portions disposed innermost, said air passage outlet surrounding said air pump means air intake and communicated therewith, said air pump means air intake opening downwardly through the center of said camber and air foil members.

11. The combination of claim 10 wherein said control valve means includes means for substantially completely closing said air pump means air intake to the ambient atmosphere while maintaining communication of said intake with said air passage outlet.

12. The combination of claim 1 wherein said airfoil and camber members are generally annular in plan and have their leading edge portions disposed outermost and their trailing edge portions disposed innermost, said air passage outlet surrounding said air pump means air intake and communicated therewith, said air pump means air intake opening downwardly through the center of said camber and airfoil members, said air pump means including an outlet having a longitudinal axis, said aircraft having means including movable control surfaces with portions thereof disposed in alignment with said air pump outlet for laterally deflecting the discharge from said air pump outlet.

13. The combination of claim 12 wherein said discharge deflecting means includes means adapted to deflect portions of said discharge at substantially right angles to the longitudinal axis of said air pump outlet.

14. The combination of claim 1 wherein said aircraft comprises a platform, said airfoil member and said camber member being generally annular in plan and having medial planes generally paralleling the medial plane of said platform, said air foil and camber members having their leading edge portions disposed outermost and their trailing edge portions disposed innermost, said air passage outlet surrounding said air pump means air intake and communicated therewith, said air pump means air intake opening downwardly through the center of said camber and airfoil members, and said platform, said air pump means being of the axial flow type including a turbine member mounted for rotation about an axis generally paralleling the flow of air into said air pump means air intake and the flow of air out of said air passage outlet, said air pump means including a generally cylindrical housing with one end thereof defining said air intake and the other end thereof defining the outlet of said air pump means, the outlet end of said housing being disposed on the side of said platform remote from the air passage inlet and including a laterally opening supplemental outlet and movable discharge deflecting means for selectively varying the discharge from the air pump means through said air pump means outlet and said supplemental outlet, and means rotatably supporting said housing from said platform for rotation about the longitudinal axis of said housing.

15. The combination of claim 14 wherein the free end of the outlet end of said housing comprises a supporting leg for said platform and includes transverse discharge openings in its terminal end portion.

16. The combination of claim 15 wherein said inlet opening movable intake valve means includes safety pressure differential valve means for at least partially opening said inlet openings in response to pressure reduction in said air passage beyond a given point relative to the air pressure disposed above the outer surface of said camber member.

17. The combination of claim 16 wherein said control valve means includes means for substantially completely closing said intake air pump means air to the ambient atmosphere while maintaining communication of said intake air pump means air and said air passage outlet.

18. The combination of claim 1 wherein said airfoil member and said camber members are generally annular in plan and have their leading edge portions disposed outermost and their trailing edge portions disposed innermost, said air passage outlet surrounding said air pump means air intake and communicated therewith, said air pump means air intake opening downwardly through the center of said camber and airfoil members, said air pump means being of the axial flow type including a turbine member mounted for rotation about an axis generally paralleling the flow of air into said air pump means air intake and the flow of air out of said air passage outlet.

19. The combination of claim 1 wherein said airfoil member and said camber members are generally annular in plan and have their leading edge portions disposed outermost and their trailing edge portions disposed innermost, said air passage outlet surrounding said air pump means air intake and communicated therewith, said air pump means air intake opening downwardly through the center of said camber and airfoil members, said inlet opening movable intake valve means including safety pressure differential valve means for at least partially opening said inlet openings in response to pressure reduction in said air passage beyond a given point relative to the air pressure disposed above the outer surface of said camber member.

References Cited in the file of this patent

UNITED STATES PATENTS

| | | |
|---|---|---|
| 2,912,189 | Pouit | Nov. 10, 1959 |
| 2,961,192 | Davidson | Nov. 22, 1960 |
| 3,026,066 | Coates | Mar. 20, 1962 |
| 3,029,044 | Childress | Apr. 10, 1962 |